US012562574B2

(12) United States Patent
Kisner et al.

(10) Patent No.: US 12,562,574 B2
(45) Date of Patent: Feb. 24, 2026

(54) METHOD FOR OPERATING A POWER GRID, POWER GRID, CONTROL UNIT AND COMPUTER PROGRAM FOR OPERATING THE POWER GRID

(71) Applicant: Viessmann Climate Solutions SE, Allendorf (DE)

(72) Inventors: Viktor Kisner, Berlin (DE); Max Pritzkoleit, Berlin (DE); Maciej Zielonka, Gdansk (PL)

(73) Assignee: Viessmann Climate Solutions SE, Allendorf (DE)

( * ) Notice: Subject to any disclaimer, the term of this patent is extended or adjusted under 35 U.S.C. 154(b) by 0 days.

(21) Appl. No.: 18/889,554

(22) Filed: Sep. 19, 2024

(65) Prior Publication Data

US 2025/0105627 A1     Mar. 27, 2025

(30) Foreign Application Priority Data

Sep. 22, 2023     (EP) .................................... 23199090

(51) Int. Cl.
H02J 3/32          (2006.01)
H02J 3/00          (2006.01)
H02J 7/04          (2006.01)

(52) U.S. Cl.
CPC .............. H02J 3/32 (2013.01); H02J 3/004 (2020.01); H02J 7/04 (2013.01)

(58) Field of Classification Search
CPC ................ H02J 3/004; H02J 3/32; H02J 7/04
USPC ........................................................... 307/46
See application file for complete search history.

(56) References Cited

U.S. PATENT DOCUMENTS

| | | | |
|---|---|---|---|
| 8,222,765 B2 * | 7/2012 | Collins ..................... | H02J 3/28 |
| | | | 307/44 |
| 9,118,212 B2 | 8/2015 | Hantschel | |
| 9,641,021 B2 * | 5/2017 | Gong ......................... | H02J 7/35 |
| 10,331,157 B2 * | 6/2019 | Dennis ...................... | G05F 1/66 |
| 2010/0231045 A1 | 9/2010 | Collins et al. | |
| 2014/0210275 A1 | 7/2014 | Gong et al. | |
| 2017/0192445 A1 | 7/2017 | Dennis et al. | |

FOREIGN PATENT DOCUMENTS

| | | |
|---|---|---|
| DE | 102010016138 A1 | 9/2011 |
| DE | 102011080830 A1 | 2/2013 |
| DE | 102014206892 A1 | 2/2015 |

* cited by examiner

*Primary Examiner* — Hal Kaplan
(74) *Attorney, Agent, or Firm* — Laurence A. Greenberg; Werner H. Stemer; Ralph E. Locher

(57) ABSTRACT

A method operates a power grid, which has a DC voltage circuit and an AC voltage circuit, which are electrically connected by a converter. The AC voltage circuit has a supply connection for connecting to a supply network, and an energy store and a generator are connected to the DC voltage circuit. A predicted power of an electrical power provided by the generator is ascertained for a time window, and an energy value that corresponds to the proportion of the predicted power above a power value of the converter is ascertained. A desired state of charge of the energy store that corresponds to a maximum energy that is able to be stored by the energy store minus the energy value is ascertained. The energy store is charged up to a maximum of the desired state of charge if an actual power of the generator is less than the power value.

10 Claims, 2 Drawing Sheets

METHOD FOR OPERATING A POWER GRID, POWER GRID, CONTROL UNIT AND COMPUTER PROGRAM FOR OPERATING THE POWER GRID

CROSS-REFERENCE TO RELATED APPLICATION

This application claims the priority, under 35 U.S.C. § 119, of European Patent Application EP 23 199 090.4, filed Sep. 22, 2023; the prior application is herewith incorporated by reference in its entirety.

FIELD AND BACKGROUND OF THE INVENTION

The invention relates to a method for operating a power grid that has a DC voltage circuit and an AC voltage circuit that are electrically connected by means of a converter. The invention also relates to a power grid, a control unit and a computer program product.

Private households increasingly have a generator for their own use and/or for feeding into a supply network, which generator is predominantly operated with regenerative/renewable energies. A generator of this type is, for example, a photovoltaic installation (PV installation), in which a maximum power is usually less than 30 kW. If electrical power is provided by means of the photovoltaic installation, it is used for the private household's own use. Any additional power is usually fed into the supply network. A DC voltage is usually provided by means of the photovoltaic installation. Since most loads in the private household and the supply grid operate with an AC voltage, however, it is necessary for a converter, which is usually in the form of an inverter, to be connected between them, by means of which the DC voltage is transformed into an AC voltage.

If a comparatively large number of private households of this type are present in an area, it is possible that more electrical power is fed into the supply network than there is a need for. In this case, the operator of the supply network restricts/limits the feeding in so that overloading of the supply network is avoided. However, all of the electrical power provided or able to be provided by means of the photovoltaic installation is then not used.

In order to increase efficiency and/or self-sufficiency, therefore, at least some of the private households have an energy store which is configured, for example, as an electrochemical storage device. It is therefore possible to use the electrical power provided by means of the generator to charge the energy store, if feeding into the supply network is limited/prevented, and if the electrical power is not required by the private household itself. If no electrical power is provided by means of the generator, for example at night, the required electrical power can then be obtained from the energy store without having to retrieve it from the supply network.

It is necessary in this case to adjust the individual components, specifically the energy store, the converter and the photovoltaic installation, as well as the respective power and efficiency thereof to one another. Normally, a maximum power of the photovoltaic installation is selected to be higher than that of the converter. Specifically, the maximum power is reached only rarely by means of the photovoltaic installation, since, on the one hand, there has to be a comparatively high solar radiation for this purpose, that is to say that in particular there must not be any cloud, or the like. On the other hand, a comparatively favorable angle of incidence of the light on the photovoltaic installation is required for this purpose, which is, however, usually only the case for short periods of time. On account of the reduced dimensions of the converter, however, it is possible to use more cost-effective components, which usually have improved efficiency. Therefore, an internal resistance of semiconductor switches with a lower current-carrying capacity is usually reduced, which is why efficiency, especially in the partial load range of the converter, is then improved.

SUMMARY OF THE INVENTION

The invention is based on the object of specifying a particularly suitable method for operating a power grid and a particularly suitable power grid, as well as a particularly suitable control unit and a particularly suitable computer program product, wherein efficiency is advantageously increased.

This object is achieved according to the invention for the method by the features of the independent method claim, for the power grid by the features of the independent power grid claim, for the control unit by the features of the independent control unit claim and for the computer program product by the features of the independent computer program product claim. Advantageous developments and configurations are the subject matter of the respective dependent claims.

With the foregoing and other objects in view there is provided, in accordance with the invention, a method for operating a power grid. The power grid has a DC voltage circuit and an AC voltage circuit being electrically connected by means of a converter. The AC voltage circuit has a supply connection for connecting to a supply network, and an energy store and a generator are connected to the DC voltage circuit. The method includes ascertaining a predicted power of electrical power provided by means of the generator for a time window, ascertaining an energy value corresponding to a proportion of the predicted power above a power value of the converter, and ascertaining a desired state of charge of the energy store that corresponds to a maximum energy that is able to be stored by means of the energy store minus the energy value. The energy store is charged up to a maximum of the desired state of charge if an actual power of the generator is less than the power value.

The method is used to operate a power grid. The power grid has a DC voltage circuit and an AC voltage circuit. A DC voltage is carried in the DC voltage circuit, whereas an AC voltage is carried in the AC voltage circuit.

In other words, the AC voltage circuit has at least one electrical phase, by means of which a temporally variable electrical potential is carried. The potential is in particular sinusoidal and has a certain frequency and amplitude. Preferably, in this case, the frequency is 50 Hz or 60 Hz, and the amplitude is 230 V or 110 V. The AC voltage circuit suitably contains more of such phases, preferably three, and therefore has a three-phase configuration. In particular, a sinusoidal electrical potential is present at each of the phases. In particular, the frequency and/or amplitude of the respective electrical potentials are equal, but these are shifted with respect to one another, such that a phase angle of 120° is expediently formed between them in each case. In particular, the AC voltage circuit additionally has a reference potential, for example ground. The AC voltage circuit therefore has a temporally variable electrical potential, which is in particular varied periodically, preferably sinusoidally.

The DC voltage circuit and the AC voltage circuit are electrically connected to one another by means of a converter. It is possible here to use the converter to transfer electrical energy from one of the circuits to the other circuit. By way of example, the converter is only able to be operated as an inverter, and so it is possible to use the converter to transfer electrical energy from the DC voltage circuit to the AC voltage circuit. Preferably, the converter is also configured to be capable of feedback, and so it may also be operated as a rectifier. It is therefore possible to also transfer electrical energy from the AC voltage circuit to the DC voltage circuit by means of the converter. The converter is at least in the form of a DC/AC converter or may be operated in this way.

By way of example, the converter is adjusted to the topology of the AC voltage circuit, i.e. in particular to the number of phases. For example, the converter has a three-phase configuration. If the converter and the AC voltage circuit have a three-phase configuration, when electrical energy is being transferred from the DC voltage circuit to the AC voltage circuit, the converter is used to divide the energy, for example, evenly across all the phases or only or predominantly across one of the phases. This is in particular selected suitably. Alternatively to this, the converter only has a single-phase configuration. In this case, for example, the AC voltage circuit is also only single-phase, or the converter is only assigned to one of the phases of the AC voltage circuit.

The converter expediently has a bridge circuit, in particular a B6 circuit. In this case, the converter contains a number of bridge branches. If the converter has a three-phase configuration, there are in particular three of such bridge branches present. In particular, each of the bridge branches has two semiconductor switches, preferably field-effect transistors, for example MOSFETs, GTOs, or IGBTs, which are electrically connected in series. If the converter is single-phase, there is only one bridge branch or a single switch present.

The AC voltage circuit has a supply connection for connecting to a supply network. The supply connection is suitable, and is in particular provided and configured, for this purpose. The supply network is not a component of the power grid, but it is in particular possible to feed the power grid by means of the supply network via the supply connection or, for example, to transfer electrical energy from the power grid to the supply network. Expediently, the supply network has a three-phase configuration. In particular, an AC voltage, which is, for example, 230 V or 110 V, is carried by means of the supply network. In particular, the frequency of the AC voltage is 50 Hz or 60 Hz. Suitably, the supply connection has an electricity meter or the like, by means of which the electrical energy transmitted between the supply network and the power grid is able to be determined.

The supply connection in particular constitutes a house connection or the like, which is provided, for example, by an electricity supplier or operator of the supply network. In contrast, the power grid is expediently a component of a building or of an apartment. The power grid is suitably a component of a household, such as a private household. Alternatively, the power grid is a component of an agricultural unit or industrial installation. The power grid is at least preferably assigned to one or more local building units, that is to say to an association of a limited number of buildings, wherein the number of buildings is less than 10. The power grid is preferably provided and configured to carry a maximum electrical power of 500 KW, 300 KW, 200 kW, 100 KW or less. In contrast, a plurality of local building units/households of this type are able to be supplied with power by means of the supply network, for the purpose of which the supply network is suitable, provided and configured.

The power grid also contains an energy store that is electrically connected to the DC voltage circuit. A DC voltage is therefore present at the energy store during operation. It is possible here to store electrical energy by means of the energy storage system. The energy store preferably comprises a control device and an energy storage unit, wherein the energy storage unit is in particular operated by means of the control device. The charging/discharging of the energy storage unit is preferably controlled/regulated by means of the control device. By way of example, the energy storage unit has individual structural units, such as modules, and the control device is used to select that structural unit into which electrical energy is to be fed or which is to be discharged. The converter is preferably in the form of what is known as a hybrid inverter. The converter is therefore also used to at least partially control/regulate charging/discharging of the energy store. In other words, the possible control device is at least partially formed by means of the converter. The control device preferably contains a step-up converter and/or a step-down converter, by means of which it is in particular possible to match a voltage provided by means of the energy storage unit to the voltage carried by means of the DC voltage circuit. By way of example, the energy store is a component of a motor vehicle or is connected to a building in a suitably immobile and/or fixed manner.

Particularly preferably, the energy store is an electrochemical storage device and is therefore in particular in the form of a battery, preferably a high-voltage battery. The energy storage unit has a plurality of battery cells, which, for example, are combined to form individual battery modules. In this case, the individual battery modules are expediently of identical design to one another. The individual battery cells/battery modules are suitably at least partially electrically connected in series and/or in parallel. In particular, the control device is therefore a battery management system. This is therefore used to select the individual battery cells/battery modules such that optimal charging/discharging of the energy store takes place, wherein electrical losses that occur are preferably reduced.

The power grid also has a generator. An electric current, in particular an electrical power, is provided by means of the generator. In particular, the electric current provided is temporally variable and in particular dependent on environmental conditions. The generator is preferably operated with regenerative/renewable energies. By way of example, the generator is a wind turbine or particularly preferably a photovoltaic installation. By way of example, the generator is thus formed in each case. Alternatively, the generator contains a plurality of subunits, for example, one of which is the photovoltaic installation. By way of example, a further one of the subunits is the wind turbine, provided that it is used in particular to provide a DC voltage. In another alternative, the generator is, or at least comprises, a fuel cell. The generator is also electrically connected to the DC voltage circuit, which is used to provide a DC voltage. By way of example, the DC voltage is constant or temporally variable.

In the method, a predicted power of an electrical power provided by means of the generator is ascertained for a time window. In other words, an assumption is made for the electrical power provided by means of the generator during the time window. In particular, a temporal profile of the electrical power is thus established. The time window is in the future, for example temporally immediately after, or at a certain time interval from, the time the prediction was made. In particular, the assumed power, or a value corresponding thereto, such as an electric current provided by means of the generator, is ascertained directly in order to determine the predicted power. The predicted power is established in particular for different time periods of the time window. In particular, a constant predicted power is assumed for each of the time periods, which reduces outlay. Expediently, the length of the time periods is constant, and the time window is therefore divided into the time periods. By way of example, the length of one of the time periods is between 1 minute and half an hour, preferably between 5 minutes and 20 minutes, or in particular between 10 minutes and 15 minutes. It is therefore possible to take different environmental influences into account comparatively accurately in the prediction, with outlay being reduced.

In a subsequent work step, an energy value is ascertained. The energy value corresponds to the proportion of the predicted power above a power value of the converter. The energy value is therefore also established for the time window, and a check is preferably carried out for the individual time periods to determine whether the predicted power is above the power value. If this is the case, the product of the length of the time period and the difference between the predicted power and the power value is suitably added to the energy value. In particular, the sum created in this way corresponds to the energy value. If the predicted power for one of the time periods is below the power value, the energy value is not changed, in particular for this time period. In one development, integration is performed instead of summation, for example, which increases accuracy. An alternative procedure uses a mathematical model and/or, for example, an optimization method to establish the energy value. This increases robustness, wherein an exact formulation of the problem is not necessary on account of the optimization method, and it is therefore possible to ascertain the energy value with comparatively low hardware resources, even if, for example, a duration is (slightly) extended and/or accuracy is (slightly) reduced. Regardless of the method used, for example, the value established in each case is used directly as the energy value. In one development, further processing is additionally carried out, for example multiplication by a certain factor, by means of which losses of the converter are taken into account, for example.

The power value of the converter is preferably constant, or, for example, depending on current conditions. In particular, the power value corresponds to a maximum power of the converter or preferably a rated power of the converter, i.e. the power for which the converter is configured to operate. Alternatively, the power value corresponds to an operating point at which losses that occur are at a minimum or an efficiency is at a maximum. In particular, the power value therefore corresponds to an optimal operating point of the converter. By way of example, the power value is specified by a manufacturer of the converter or is ascertained on the basis of operating data of the converter, such that aging/heating or other parameters are taken into account.

In summary, the energy value corresponds to the proportion of the predicted energy that is not able to be fed into the AC voltage circuit by means of the converter during the time window, in particular due to a limitation of the converter.

In a subsequent work step, a desired state of charge of the energy store is ascertained. In this case, the state of charge corresponds to a maximum energy that is able to be stored by means of the energy store minus the energy value. In particular, the desired state of charge in this case corresponds to the ratio between this difference and the maximum energy that is able to be stored by means of the energy store. The maximum energy that is able to be stored by means of the energy store is specified in particular by means of a design of the energy store. By way of example, this energy is assumed to be constant during operation of the power grid. Alternatively, it is adjusted at least at certain times, wherein aging effects, environmental effects and/or operating data of the energy store are suitably taken into account. An appropriate adjustment is suitably made every year or every six months, for example. Outlay is therefore comparatively low.

In a subsequent work step, the energy store is charged up to a maximum of the desired state of charge if an actual power of the generator is less than the power value. This work step is therefore carried out during the time window, and during the time window, the (electrical) power actually provided by means of the generator is therefore ascertained. If the prediction was comparatively accurate, the predicted power corresponds to the actual power, in particular for each, or at least the majority, of the time periods. In summary, the actual electrical power provided by means of the generator is ascertained and used as the actual power. In this case, the electrical energy stored by means of the energy store is therefore limited for as long as the converter is operated below the power value.

Owing to this method, as long as the converter is operated below the power value, a capacity is therefore kept free in the energy store. If the present circumstances change, it is possible to react to this in a flexible manner. In summary, the energy store therefore provides a buffer capacity, which can be used if required, wherein it is possible to operate the converter over a comparatively long period of time during the time window by means of the power value. This increases efficiency. Overloading of the converter and the energy store is avoided. In this case, in particular, the energy store is charged up to a maximum of the desired state of charge for as long as the time window lasts.

Expediently, the converter is operated during the method, with the result that electrical energy is transferred from the DC voltage circuit to the AC voltage circuit by means of the converter. For as long as the energy store is not charged and the actual power is less than the power value, the power provided by means of the converter, i.e. fed into the AC voltage circuit, corresponds essentially to the power provided by the generator, i.e. the actual power, minus any losses owing to the operation of the converter.

If the actual power of the generator is greater than the power value, in particular the energy store is charged. This avoids limiting a generation power of the generator. If the energy store has not yet been charged up to the desired state of charge, charging will take place in particular until then. If, when the actual power of the generator is greater than the power value, the energy store already has the desired state of charge, the desired state of charge is conveniently raised/adjusted. This is also suitably carried out when the desired state of charge is reached, as long as the actual power of the generator is greater than the power value. The desired state of charge is preferably adjusted/updated iteratively.

By way of example, the desired state of charge is then ascertained theoretically, for which purpose the proportion of the actual power above the power value is integrated over time or multiplied by the length of the respective time periods. The desired state of charge is preferably adjusted in certain time windows. By way of example, the time window is greater than 5 seconds and suitably less than 1 minute or 30 seconds. The time window is expediently 10 seconds.

Alternatively, as long as the actual power of the generator is greater than the power value, the converter is operated in a desired manner, wherein the electrical energy that is otherwise available is transferred to the energy store. If the actual power drops below the power value, the energy store will stop charging. The state of charge then present is expediently subsequently used as the new desired state of charge. The energy store is only charged with the proportion of the generated power that would otherwise be lost due to the power limit of the converter.

By way of example, if the actual power of the generator is greater than the power value, the converter is operated at a certain power that is less than the power value. However, the converter is particularly preferably operated at the power value. Therefore, if the actual power is greater than the power value, the electrical power, provided by means of the generator, that is beyond the power value is stored in the energy store, whereas the electrical power corresponding to the power value is fed into the AC voltage circuit by means of the converter. Since sufficient capacity is available in the energy store due to the limitation, which has applied until then, to the desired state of charge, essentially all of the electrical energy provided by means of the generator is therefore able to be used, which is why efficiency is increased. In this case, overloading of the energy store and the converter is ruled out. It is also possible here to use a converter with comparatively small dimensions without a provided electrical energy being used. In summary, owing to the method, sufficient capacity is therefore kept available by means of the energy store in order, at a maximum power of the generator, in particular during what is known as a peak time, to store the electrical energy then provided, which is not able to be transferred to the AC voltage circuit by means of the converter. Efficiency is therefore increased, wherein the hardware requirements of the circuit are reduced.

By way of example, all of the electrical energy provided by means of the converter is fed into the supply network via the supply connection. Alternatively, there is, for example, a power limitation for the supply connection, which is constant or variable over time, for example. In particular, the power limitation corresponds to a feed-in limitation that is specified, for example, by an operator of the supply network. If the power fed into the AC voltage circuit by means of the converter, which corresponds in particular to the actual power of the generator or, if this is greater than the power value, to the power value, is greater than the power limitation that applies for the supply connection, the converter is operated at reduced power. In particular, the converter is operated at the power limitation value, in particular if there is no other removal of electrical energy from the AC voltage circuit. If this is the case, operation is in particular carried out with the power limitation plus the electrical power otherwise required in the AC voltage circuit. The converter is therefore operated in a restricted manner, and the electrical power therefore present in the DC circuit is used to charge the energy store.

In this case, In particular, the energy store is charged up to the desired state of charge. If the energy store has already reached the desired state of charge, the state of charge is expediently raised or, in particular, the limitation is canceled as long as the converter is operated at reduced power due to the power limitation. If the power limitation is canceled or the actual power of the generator is less than the power limitation, the energy store will, in particular, stop charging and the state of charge, which is then present, of the energy store will subsequently be used as the desired state of charge. The electrical power provided by means of the generator is therefore always used, even if, for example, it is not possible to feed into the supply network due to present circumstances, even if the converter is not yet being operated at its power value. Efficiency is therefore further increased.

By way of example, the circuit has a load that is electrically connected to the AC voltage circuit. It is, however, at least possible to connect a load to the AC voltage circuit. By way of example, the load is formed by means of only one single unit. Alternatively, the load contains a plurality of individual units, which, however, for example, do not have any further connection to one other, except that they are powered and/or operated by means of the AC voltage circuit. By way of example, at least one of the units is used to increase the convenience for a user of the circuit. Suitably, one of the units is a heat pump, which in particular is used to heat the structural unit comprising the circuit. Alternatively or in combination, one of the units is an air-conditioning installation or what is known as a Wallbox, for example.

Electrical energy/power is preferably fed into the supply network preferably only if at least a desired operation of the load by means of the energy present in the AC voltage circuit is possible. If, for example, the actual power of the generator is not sufficient to operate the load, additional electrical power is obtained from the supply network so that the desired operation of the load is possible. Alternatively or in combination, the energy store is discharged, for example, and in this way the converter is used to feed the AC voltage circuit, with the result that the load is able to be operated.

The power required by the load is preferably ascertained in the method. By way of example, if no actual power is created by means of the generator, or this is too low to operate the load, the energy store is preferably discharged and in this way electrical energy is provided to operate the converter, which is used to feed the AC voltage circuit. The converter is preferably operated at the value for the required power, or a value slightly higher than this, such that any losses are able to be compensated for. It is therefore possible to operate the load, wherein the energy store is at least partially discharged, and wherein it is not necessary to obtain electrical energy from the supply network.

By way of example, the energy store is charged irrespective of the required power. Particularly preferably, however, the energy store is only charged if the actual power is greater than the required power. In particular, any electrical losses occurring as a result of the operation of the converter are taken into account, and the required power is corrected accordingly. In the method, operation of the load is therefore first ensured, and only then, with a lower priority, is the energy store charged. As a result, it is only rarely necessary to obtain electrical energy from the supply network, wherein a comparatively large buffer capacity is provided by means of the energy store. If the required power and actual power are greater than the power value, the converter is operated at the power value and the energy store is also charged. The additional power/energy required to operate the load is then preferably retrieved from the supply network via the supply connection. Such a method ensures that as little energy as possible is retrieved from the supply network, thereby increasing the self-sufficiency of the power grid.

By way of example, the predicted power is ascertained only once, preferably before the start of the time window. Alternatively, the predicted power is adjusted during the time window, for example continuously or at specific time intervals, for example every hour, every 15 minutes, every 5 minutes, or every 10 seconds. Depending on the respectively adjusted predicted power, the desired state of charge is also suitably adjusted accordingly. As a result, for example, errors in creating the forecast that have arisen owing to changed environmental conditions are quickly compensated for, with the result that desired operation of the energy store and the converter is subsequently made possible. Therefore, despite the initially comparatively high level of inaccuracy, efficiency is still comparatively high.

By way of example, 1 week or 1 hour is selected as the time window. Particularly preferably, the time window has a length of between 6 hours and 72 hours, and in particular, the length is equal to 12 hours or 24 hours. With a time window of such a length, the predicted power corresponds to the actual power sufficiently precisely, with the result that comparatively efficient operation of the power grid is made possible. Outlay is also reduced as a result. In addition, the actual power differs comparatively little over consecutive days, making it easier to make the prediction. In particular, the length of possible time periods is between 10 minutes and 20 minutes and, for example, equal to 15 minutes. In particular, in this case, a desired state of charge is ascertained and/or a value for the predicted power is established every 15 minutes.

Preferably, an "artificial intelligence" (AI) algorithm, in particular machine learning or a neural network, is used to ascertain the predicted power. By way of example, the predicted power is ascertained on the basis of a theoretical model. The predicted power is expediently ascertained on the basis of actual powers achieved. By way of example, for this purpose, the actual powers for a number of previous time windows are used and the mean value thereof is used as the predicted power, for example. By way of example, the individual actual powers are weighted differently. In one alternative, the predicted power is preferably ascertained by means of a spline interpolation from the actual powers. By way of example, the number of time windows actually used is less than 10 and preferably greater than 2. Outlay is therefore reduced.

The predicted power is preferably ascertained by means of a spline interpolation, wherein, in particular, the mean values of the actual power from an immediately preceding duration are used. The length of the duration is suitably between 1 minute and 30 minutes and preferably between 10 minutes and 20 minutes and is expediently equal to 15 minutes. Preferably, the actual power is sampled every 10 seconds for this purpose. The predicted power for a further duration that expediently follows directly is established on the basis of these ascertained values. Suitably, the length of the further duration is between 30 minutes and 2 hours and, for example, equal to 1 hour.

Alternatively or in combination, the predicted power is ascertained on the basis of a weather forecast. By way of example, the forecast is created during the method, or it is retrieved from an external source, preferably via the Internet. By way of example, the predicted power is ascertained on the basis of weather data, or weather data that have already been processed, such as radiation intensity, for example, are retrieved and are used as a basis to ascertain the predicted power. Accuracy when ascertaining the predicted power is therefore increased, without the need for knowledge about specific meteorological models. If the generator is formed by means of, or comprises, a photovoltaic installation, in particular a radiation forecast is obtained from a weather service. In this way, environmental conditions affecting the operation of the generator are taken into account.

The power grid has a DC voltage circuit to which an energy store and a generator are electrically connected. The generator is operated in particular by means of regenerative or renewable energies. The actual power provided by means of the generator is in particular not constant over time, but rather is dependent on environmental conditions. By way of example, the generator is formed by means of, or at least comprises, a photovoltaic installation. The energy store suitably has a control device and an energy storage unit. The energy storage unit expediently comprises an electrochemical energy storage device, such as a battery.

The power grid also comprises an AC voltage circuit, which is electrically connected to the DC voltage circuit by means of a converter. In this case, the converter is expediently in the form of what is known as a hybrid inverter, and by means of which the energy store is at least partially operated, for example. The AC voltage circuit preferably has a three-phase configuration, and by means of which a three-phase AC current is carried during operation. In this case, the amplitude of each of the electrical phases is expediently the same and, for example, 230 V or 110 V. The electrical potential carried by means of each of the phases has a frequency of 50 Hz or 60 Hz. In particular, the profile of the electrical potential of each phase is sinusoidal, and the electrical potentials of the individual phases are preferably shifted by 120° with respect to one another.

The AC voltage circuit has a supply connection for connecting to a supply network. The supply connection, which is also referred to as the "point of common coupling" (PCC) or house connection, for example, is suitable, in particular provided and configured, for this purpose. It is therefore suitably possible to transfer electrical energy between the supply network and the power grid, wherein in particular an electric current flows between them. The voltage in the supply network is expediently equal to the voltage in the AC voltage circuit.

The power grid is operated according to a method in which a predicted power of an electrical power provided by means of the generator is established for a time window. An energy value that corresponds to the proportion of the predicted power above a power value of the converter is ascertained, and a desired state of charge of the energy store that corresponds to a maximum energy that is able to be stored by means of the energy store minus the energy value is ascertained. The energy store is charged up to a maximum of the desired state of charge if an actual power of the generator is less than the power value.

In particular, the power grid has a control unit, which is provided and configured to carry out the method. By way of example, the control unit comprises an application-specific circuit (ASIC) or, particularly preferably, a computer that is suitably configured to be programmable. In particular, the control unit has a storage medium on which a computer program product, which is also referred to as a computer program, is stored, wherein, when this computer program product is executed, the computer is caused to carry out the method. The control unit is expediently connected to the generator, the energy store and/or the converter for signal purposes, preferably by means of a corresponding connection of the control unit. The converter and/or the energy store are preferably controlled and/or regulated in accordance with the method. In particular, a communication network, which is configured in the form of a bus system, for example, is at least partially formed by means of the control unit, the generator, the energy store and/or the converter.

By way of example, the control unit is a separate component, or for example is integrated into the energy store, and charging/discharging of the energy store is controlled/regulated by means of the control unit, for example. In particular, the possible control device of the energy store is therefore formed by means of the control unit. In one development, the control unit is integrated into the converter and/or the generator, for example. By way of example, further functions are therefore also carried out and/or adopted by means of the control unit, such as adjusting the converter to a frequency and/or phase angle of the AC voltage carried by means of the AC voltage circuit. In particular, in this case, the control unit is used to ascertain the possible weather forecast and/or retrieve the forecast from an external source. The control unit is expediently suitable, in particular provided and configured, to be connected to a network, in particular the Internet, for signal purposes.

By way of example, the converter is only in the form of an inverter, with the result that it may be used only to allow an energy transfer from the DC voltage circuit to the AC voltage circuit. Alternatively, the converter is also configured to be capable of feedback, and so it may also in particular be operated as a rectifier. In particular, the converter is single-phase, which is why manufacturing costs are reduced. However, the converter is expediently multi-phase, preferably three-phase. The number of phases of the converter suitably corresponds to the number of phases of the AC voltage circuit. If electrical power/energy is transferred from the DC voltage circuit to the AC voltage circuit by means of the converter, the power/energy is fed, for example, into all the phases or only into a specific phase. The phase is preferably selected by means of an algorithm. Suitably, that phase for which a power requirement of possible loads connected to the AC voltage circuit is the highest, for example, and/or for which a power requirement of the supply network is the greatest, for example, is selected.

The control unit has a connection to connect to a converter and/or an energy store for signal purposes. By way of example, the connection is configured in the form of a plug and in particular meets a certain standard. In this case, it is possible to electrically connect the connection to a line for signal purposes. Alternatively, the connection is formed by means of a radio apparatus, which, for example, meets a certain standard, for example a mobile radio, WLAN or Bluetooth standard. Owing to the connection, it is at least possible to exchange information/signals/data between the control unit and the converter and/or between the control unit and the energy store. By way of example, the connection is configured to be only unidirectional or preferably bidirectional.

The control unit is provided and configured to carry out a method for operating a power grid that has a DC voltage circuit and an AC voltage circuit that are electrically connected by means of a converter, wherein the AC voltage circuit has a supply connection for connecting to a supply network, and wherein an energy store and a generator are connected to the DC voltage circuit. In the method, a predicted power of an electrical power provided by means of the generator is ascertained for a time window. An energy value that corresponds to the proportion of the predicted power above a power value of the converter is ascertained, and a desired state of charge of the energy store that corresponds to a maximum energy that is able to be stored by means of the energy store minus the energy value is ascertained. The energy store is charged up to a maximum of the desired state of charge if actual power of the generator is less than the power value.

By way of example, the control unit has an application-specific circuit (ASIC) and/or a microprocessor, by means of which the method is at least partially carried out. In particular, the control unit contains a computer program product, which is stored on a memory and, which, when the program is executed by a computer, such as the microprocessor, causes the computer to carry out the method. In the assembled state, the control unit is preferably a component of the converter/the generator or preferably a load of the power grid, in particular a heat pump, and is suitable, in particular provided and configured, for this purpose. By way of example, the possible load, preferably the heat pump, is operated, expediently regulated/controlled, by means of the control unit.

The invention also relates to a computer program product. The computer program product contains a number of commands that, when the program (computer program product) is executed by a computer, cause the computer to carry out a method for operating a power grid that has a DC voltage circuit and an AC voltage circuit that are electrically connected by means of a converter. The AC voltage circuit has a supply connection for connecting to a supply network, and an energy store and a generator are connected to the DC voltage circuit. In the method, a predicted power of an electrical power provided by means of the generator is ascertained for a time window. An energy value that corresponds to the proportion of the predicted power above a power value of the converter is ascertained, and a desired state of charge of the energy store that corresponds to a maximum energy that is able to be stored by means of the energy store minus the energy value is ascertained. The energy store is charged up to a maximum of the desired state of charge if an actual power of the generator is less than the power value. The computer is expediently a component of a control unit and, by way of example, is formed by means of the control unit. The computer preferably comprises a microprocessor or is formed by means of said microprocessor. By way of example, the computer program product is a file or a data carrier that contains an executable program that, when installed on a computer, automatically performs the method.

The invention also relates to a storage medium on which the computer program product is stored. A storage medium of this type is, for example, a CD-ROM, a DVD or a Blu-ray disk. Alternatively, the storage medium is a USB stick or other memory that is rewritable or is able to be written to only once, for example. A memory of this type is a flash memory, a RAM, or a ROM, for example.

The developments and advantages explained in connection with the method may be analogously also applied to the power grid/the control unit/the computer program product and also to one another, and vice versa.

Other features which are considered as characteristic for the invention are set forth in the appended claims.

Although the invention is illustrated and described herein as embodied in a method for operating a power grid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of one specific embodiment when read in connection with the accompanying drawings.

Parts corresponding to one another are provided with the same reference signs in all of the figures.

DETAILED DESCRIPTION OF THE INVENTION

Figure 1:
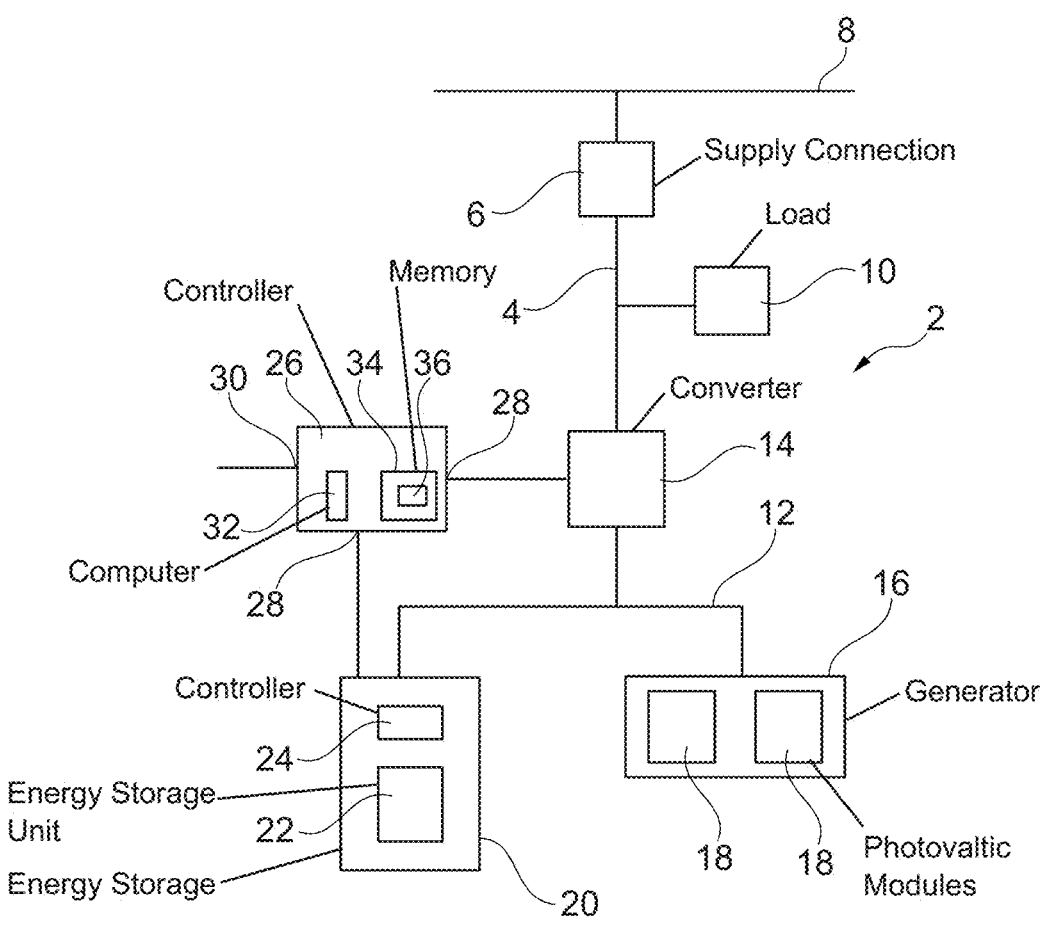
FIG. 1 is a block diagram of a power grid, which has an AC voltage circuit and a DC voltage circuit to which a generator and an energy store are connected.

Referring now to the figures of the drawings in detail and first, particularly to FIG. 1 thereof, there is shown a power grid 2, which is a component of a private household. The power grid 2 has an AC voltage circuit 4, by means of which a three-phase AC voltage is carried. Each of the phases has a temporally variable electrical potential with a sinusoidal profile. The magnitude of the voltage is 230 V in each case, and the frequency is 50 Hz. The three phases are phase-shifted by 120° with respect to one another. The AC voltage circuit 4 has a supply connection 6, which is also referred to as a house connection or PCC. A supply network 8 is connected to the supply connection 6, by means of which supply network a three-phase AC voltage of in each case 230 V is likewise carried. In this case, each of the phases of the supply network 8 makes electrical contact with a respective one of the phases of the AC voltage circuit 4 via the supply connection 6, and is in phase therewith. It is therefore possible to exchange electrical energy between the supply network 8 and the AC voltage circuit 4, and to use the supply network 8 to feed the AC voltage circuit 4 via the supply connection 6.

A load 10 makes electrical contact with the AC voltage circuit 4. The load 10 itself has a plurality of units, which are not shown in more detail, one of which, for example, is a heat pump and another is a coffee machine, a refrigerator, a television and/or a refrigerator. The individual units of the load 10 are in particular functionally independent of one another, and the only common feature that they have is that they are operated by means of the AC voltage circuit 4.

The power grid 2 also has a DC voltage circuit 12, by means of which a DC voltage is carried during operation. By way of example, the DC voltage is up to 60 V or several 100 V. The DC voltage circuit 12 is electrically connected to the AC voltage circuit 4 by means of a converter 14. In the example shown, the converter 14 has a three-phase configuration and therefore has a bridge circuit, specifically a B6 circuit. This circuit has three bridge branches, wherein each of the bridge branches is connected between the two electrical potentials of the DC voltage circuit 12, and wherein each of the bridge branches is assigned to a respective one of the phases of the AC voltage circuit 4. The converter 14 is operated as an inverter, and so it is possible to transfer electrical energy from the DC voltage circuit 12 to the AC voltage circuit 4. In addition, the inverter 14 is configured to be capable of feedback, which is why an electrical energy transfer in the opposite direction, that is to say from the AC voltage circuit 4 to the DC voltage circuit 12, is possible.

The circuit 2 also contains a generator 16, which is connected to the DC voltage circuit 12. In the variant shown, the generator 16 is in the form of a photovoltaic installation and has a plurality of photovoltaic modules 18, two of which are shown. The photovoltaic modules 18 are suitably connected electrically in series and/or in parallel with one another, and so the DC voltage carried in the DC voltage circuit 12 is provided by means of the generator 16, provided that the photovoltaic modules 18 are illuminated by sunlight.

The circuit 2 also has an energy store 20, which is also connected to the DC voltage circuit 12 and is therefore electrically connected thereto. The energy store 20 contains an energy storage unit 22, which is in the form of an electrochemical energy storage device, namely a battery, in particular a secondary battery or rechargeable battery. In addition, the energy store 20 contains a control unit 24, which is in the form of a battery management system, and by means of which charging/discharging of the energy storage unit 22 is controlled. In addition, the energy store 20 contains a step-up/step-down converter, which is not shown in more detail, by means of which the DC voltage provided by means of the energy store 20 is matched to the DC voltage provided by means of the DC voltage circuit 12.

In addition, the power grid 2 contains a control unit 26, which has two connections 28. One of the connections 28 is connected to the converter 14 for signal purposes, and the other to the energy store 20, with the result that it is possible to exchange information/data between them. In one embodiment, which is not shown in more detail, only a single connection 28 is present, by means of which the control unit 26 is connected to the converter 14 and the energy store 20 via a bus system. The control unit 26 also contains a further connection 30, by means of which a connection to the Internet is established for signal purposes.

Figure 2:
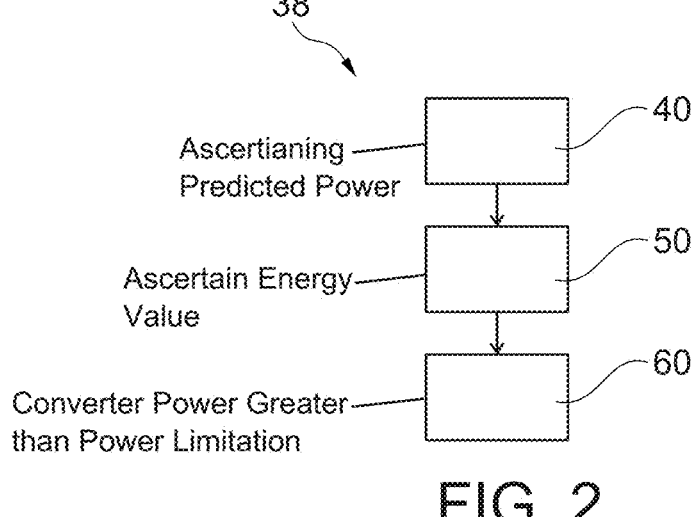
FIG. 2 is a flow chart illustrating a method for operating the power grid.

The control unit 26 has a computer 32 in the form of a programmable microprocessor and a storage medium in the form of a memory 34. A computer program product 36 is stored on the memory 34 and contains a plurality of commands that, when the program is executed by the computer 32, cause the computer to carry out a method 38, which is shown in FIG. 2, for operating the power grid 2. In other words, the power grid 2 is operated in accordance with the method 38, and the control unit 24 is provided and configured to carry out the method 38.

Figures 3, 4:
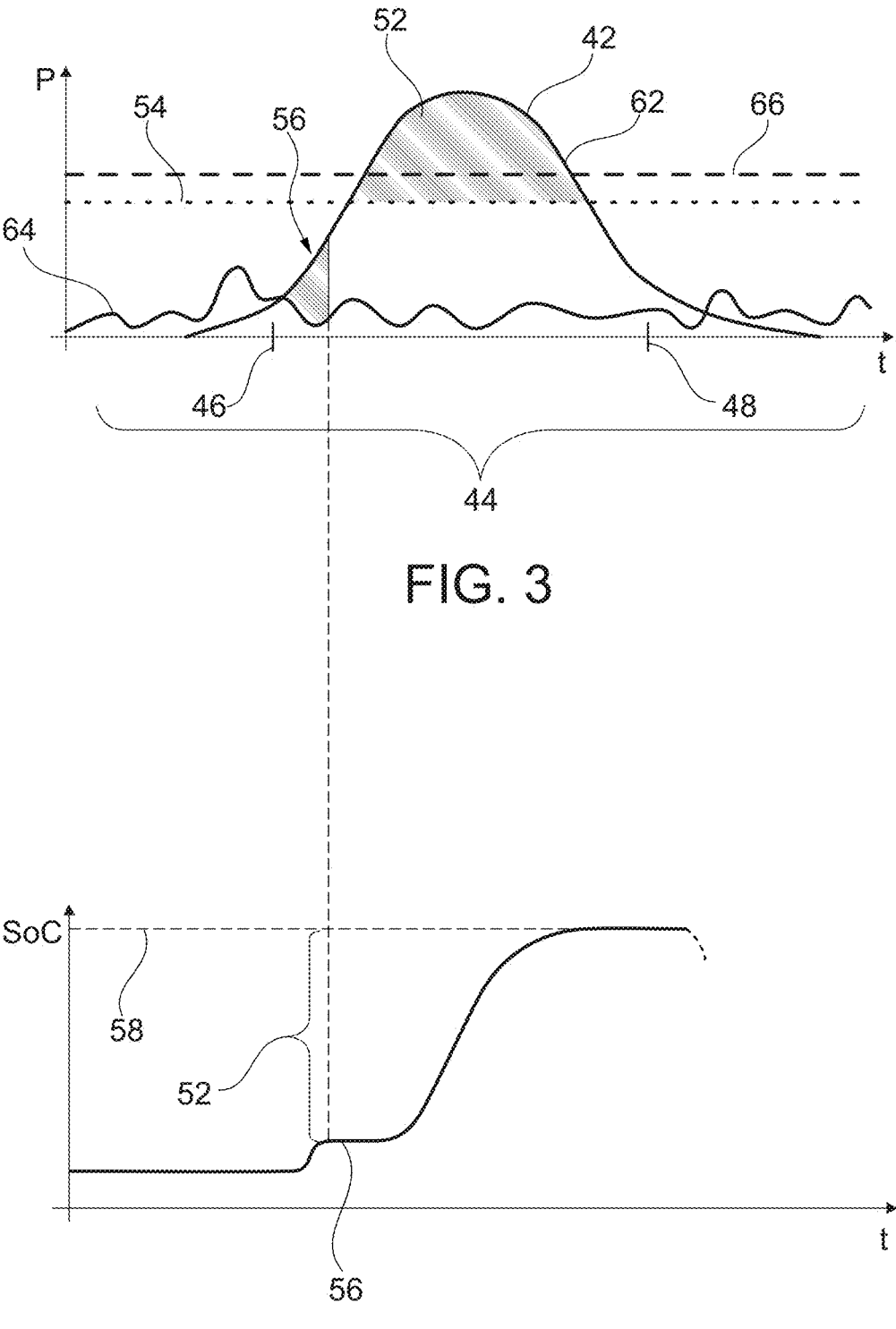
FIG. 3 is a graph showing a temporal profile of a predicted power of an electrical power provided by means of the generator.
FIG. 4 is a graph showing a temporal profile of a state of charge of the energy store.

In the method 38, a predicted power 42 of an electrical power provided by means of the generator 16 is ascertained for a time window 44 in a first work step 40. The length of the time window 44 is 24 hours in this case, and the predicted power 42 has a varying magnitude over the time window 44, as shown in FIG. 3. Therefore, during a night phase, the predicted power 42 is essentially 0 W. The predicted power 42 increases slightly until sunrise 46, to then increase comparatively sharply until midday. The predicted power 42 subsequently drops comparatively sharply until sunset 48 and then declines continuously thereafter.

The predicted power 42 is ascertained on the basis of a weather forecast. For this purpose, a radiation forecast is obtained from a weather service by means of the control unit 26 via the further connection 30 and the temporal profile of the predicted power 42 is ascertained on the basis thereof. In the example shown, the forecast shows that there will be no cloud, and so there is an essentially continuous rise and fall in the predicted power 42. The predicted power 42 ascertained in this way is adjusted on the basis of actual powers already achieved by means of the generator 16. The predicted power 42 is therefore also ascertained on the basis of actual powers achieved. In this way, aging effects are in particular taken into account. By way of example, the actual power of the five previous periods of time, which is adjusted for the weather prevailing at that time, is ascertained, and the mean value thereof in particular corresponds to the predicted power 42.

An energy value 52 is ascertained in a subsequent second work step 50. The energy value 52 corresponds to the proportion of the predicted power 42 above a power value 54 of the converter 14. The power value 54 is specified by the manufacturer of the converter 14 and corresponds to the maximum power using which the converter 14 is able to be operated. The energy value 52 corresponds to the time integral of the proportion of the predicted power 42 above the power value 54. The energy value 52 is determined by means of a mathematical optimization method, with the result that a comparatively complicated and lengthy integration method does not have to be carried out.

Furthermore, a desired state of charge 56 of the energy store 20 is ascertained in the second work step 50. The desired state of charge 56 here corresponds to a state of charge (SoC) that is equal to the maximum energy 58 that is able to be stored by means of the energy store 20 minus the energy value 52. In the example shown, the desired state of charge 56 corresponds exactly to this difference. In one alternative embodiment, the desired state of charge 56 is expressed as a percentage, and is based on the maximum energy 58 able to be stored. The maximum energy 58 able to be stored is specified owing to the design of the energy store 20, and may change owing to aging effects.

The first and the second work step 40, 50 are carried out at, or before, the start of the time window 40. When the time window 44 has started, a third work step 60 is carried out. In this work step, the actual power 62 provided by means of the generator 42 is ascertained. In particular, measured data of the generator 16 are retrieved for this purpose. In the example shown, the actual power 62 essentially corresponds to the predicted power 42. However, it is also possible for these to differ from one another, in particular if the weather changes locally and/or other environmental conditions are changed compared to the assumption when ascertaining the predicted power 42.

During the time window 44, a power 64 required by the load 10 is also ascertained. This power is not constant during the time window 44, and, for example, is dependent on an operation by a user of the load 10. If, as in the example shown, the energy store 20 is initially charged comparatively little, the power 64 required for operation of the load 10 is obtained from the supply network 8 via the supply connection 6. As soon as the actual power 62 increases, it is used for operation of the load 10, wherein only the difference between the actual power 62 and the required power 64 is taken from the supply network 8. During this time, the energy store 20 is not charged, and all of the actual power 62 is fed into the AC voltage circuit 4 by means of the converter 14.

Only if the actual power 62 exceeds the required power 64 is the excess used to charge the energy store 20. Therefore, the energy store 20 is only charged if the actual power 62 is greater than the required power 64. In this case, the energy store 20 is only charged up to the desired state of charge 56. In summary, the energy store 20 is charged up to a maximum of the desired state of charge 56 if the actual power 62 of the generator 16 is less than the power value 54. Subsequently, as long as the actual power 62 is below the power value 54, all of the actual power 62 is fed into the AC voltage circuit 4 by means of the converter 14. The proportion that exceeds the required power 64 is fed from there into the supply network 8 via the supply connection 6.

If the actual power 62 reaches the power value 54 and rises above it, the converter 14 is operated at the power value 54, i.e. at its maximum power. As a result, a power corresponding to the power value 54 is fed into the AC grid 4. From there, the proportion that exceeds the required power 64 also continues to be fed into the supply network 8. The difference between the actual power 62 and the power value 54 present in the DC voltage circuit 12 is used to charge the energy store 20. Since the energy store has until then only been charged up to the desired state of charge 56, there is still sufficient capacity available to accommodate the difference, specifically over the whole time window 44. In other words, since, in the example shown, the actual power 62 corresponds to the predicted power 42, an electrical energy at the magnitude of the energy value 52 is therefore additionally stored in the energy store 20. Therefore, even in the case of a converter 14 with comparatively small dimensions, curtailment of the generator 16 is avoided.

As long as the actual power 62 is above the power value 54, the limitation of charging up to the maximum desired state of charge 56 is canceled, and the difference between the actual power 62 and the power value 54 is used to charge the energy storage device 20. If the actual power 62 falls below the power value 54, which can occur several times during the time window 44, for example if there is cloud locally, the state of charge, which is prevailing at that time, of the energy store 20 is used as the new desired state of charge 56.

During the third work step 60, which is carried out over the duration of the time window 44, it is monitored as to whether the power provided by means of the converter 14 in the AC voltage circuit 4, which corresponds to the minimum of the actual power 62 and the power value 54, is greater than a power limitation 66 that applies for the supply connection 6. In the case of a modification, the required power 64 is also taken into account. In the example shown, the power limitation 66 is always greater than the power value 54, but it is possible that the operator of the supply network 8 lowers the power limitation 66 during the time window 44. In this case, the converter 14 is operated at reduced power, in particular at a power corresponding to the power limitation 66. In addition, the energy store 20 is charged. If the energy store has already been charged up to the state of charge 56, the limitation is canceled and additional energy is therefore stored in the energy store 20.

If the actual power 62 falls below the required power 64, the energy store 20 is discharged and the converter 14 is operated at a power corresponding to the required power 64. Therefore, operation of the consumer 10 is possible without the need to retrieve electrical energy from the supply network 8 for this purpose. If the time window 44 has elapsed, or shortly before the end of the time window 44, the method 38 is carried out again for the subsequent time window 44, that is to say for the next 24 hours.

In one development, the predicted power 42 is additionally adjusted continuously or several times during the time window 44. The mean value of the actual power 42 for a duration is ascertained. In this case, the duration corresponds to the 15 minutes before the time at which the predicted power 42 is adjusted. On the basis of the mean value and the predicted power 42 that has not yet been adjusted, the predicted power 42 is adjusted for a further time range, namely 1 hour, by means of a spline interpolation. The accuracy of the predicted power 42 is therefore increased, and the predicted power is dynamically adjusted to changing environmental conditions. The energy value 52 and the desired state of charge 56 are also adjusted on the basis of the adjusted predicted power 42. The generator 16 may therefore be essentially always operated at its maximum possible power at the respective time, and curtailing is avoided.

The invention is not restricted to the above-described exemplary embodiment. Rather, other variants of the invention may also be deduced therefrom by a person skilled in the art without departing from the subject matter of the invention. In particular, all the individual features described in connection with the exemplary embodiment can furthermore also be combined with one another in other ways, without departing from the subject matter of the invention.

The following is a summary list of reference numerals and the corresponding structure used in the above description of the invention:

2 Power grid
4 AC voltage circuit
6 Supply connection
8 Supply network
10 Load
12 DC voltage circuit
14 Converter
16 Generator
18 Photovoltaic module
20 Energy store
22 Energy storage unit
24 Control device
26 Control unit
28 Connection
30 Further connection
32 Computer
34 Memory
36 Computer program product
38 Method
40 First work step
42 Predicted power
44 Time window
46 Sunrise
48 Sunset
50 Second work step
52 Energy value
54 Power value
56 Desired state of charge
58 Maximum energy able to be stored
60 Third work step
62 Actual Power
64 Required power
66 Power limitation

The invention claimed is:

1. A method for operating a power grid, the power grid having a DC voltage circuit and an AC voltage circuit being electrically connected by means of a converter, wherein the AC voltage circuit has a supply connection for connecting to a supply network, and wherein an energy store and a generator are connected to the DC voltage circuit, which comprises:

ascertaining a predicted power of electrical power provided by means of the generator for a time window;

ascertaining an energy value corresponding to a proportion of the predicted power above a power value of the converter;

ascertaining a desired state of charge of the energy store that corresponds to a maximum energy that is able to be stored by means of the energy store minus the energy value; and charging the energy store up to a maximum of the desired state of charge if an actual power of the generator is less than the power value.

2. The method according to claim 1, wherein if the actual power of the generator is greater than the power value, the converter is operated at the power value and the energy store is charged.

3. The method according to claim 1, wherein if a power provided in the AC voltage circuit by means of the converter is greater than a power limitation that applies for the supply connection, the converter is operated at reduced power and the energy store is charged.

4. The method according to claim 1, wherein in that a required power required by a load connected to the AC voltage circuit is ascertained, and in that the energy store is only charged if the actual power is greater than the required power.

5. The method according to claim 1, which further comprises selecting the time window to be 24 hours.

6. The method according to claim 1, which further comprises ascertaining the predicted power on a basis of actual powers achieved.

7. The method according to claim 1, which further comprises ascertaining the predicted power on a basis of a weather forecast.

8. A power grid, comprising:

a DC voltage circuit;

an energy store connected to said DC voltage circuit;

a generator connected to said DC voltage circuit;

an AC voltage circuit having a supply connection for connecting to a supply network;

a converter, said DC voltage circuit and said AC voltage circuit are electrically connected by means of said converter; and the power grid is operated in accordance with the method according to claim 1.

9. A controller, comprising:

a connection for connecting to a converter and/or an energy store for signal purposes; and the controller is configured to carry out the method according to claim 1.

10. A non-transitory computer readable medium having computer executable instructions which when executed by a computer, cause the computer to carry out the method according to claim 1.

* * * * *